United States Patent
Park et al.

(10) Patent No.: US 8,374,274 B2
(45) Date of Patent: *Feb. 12, 2013

(54) METHODS AND SYSTEMS USING NORM APPROXIMATION FOR MAXIMUM LIKELIHOOD MIMO DECODING

(75) Inventors: Jong Hyeon Park, San Jose, CA (US); Matthias Brehler, Boulder, CO (US); Brian Clarke Banister, San Diego, CA (US); Albert van Zelst, Woerden (NL); Tae Ryun Chang, Santa Clara, CA (US); Vincent K. Jones, Redwood City, CA (US); Je Woo Kim, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1070 days.

This patent is subject to a terminal disclaimer.

(21) Appl. No.: 12/351,820

(22) Filed: Jan. 10, 2009

(65) Prior Publication Data

US 2010/0091912 A1    Apr. 15, 2010

Related U.S. Application Data

(60) Provisional application No. 61/105,008, filed on Oct. 13, 2008.

(51) Int. Cl.
H04B 7/02 (2006.01)
H04L 1/02 (2006.01)
(52) U.S. Cl. .......... 375/267; 375/260; 375/341
(58) Field of Classification Search .......... 375/260, 375/262, 267, 341, 299, 346–350; 370/203–211
See application file for complete search history.

(56) References Cited

U.S. PATENT DOCUMENTS

| 8,229,013 B2* | 7/2012 | Park et al. | 375/262 |
| 2008/0152027 A1* | 6/2008 | Kalluri et al. | 375/260 |
| 2008/0181322 A1* | 7/2008 | Waters et al. | 375/260 |
| 2010/0111160 A1* | 5/2010 | Siti | 375/233 |

FOREIGN PATENT DOCUMENTS

WO    WO2008027554    3/2008

OTHER PUBLICATIONS

International Search Report and Written Opinion—PCT/US2009/059147, International Search Authority—European Patent Office—Jul. 27, 2010.
Li, Min et al.: "An Implementation Friendly Low Complexity Multiplierless LLR generator for Soft MIMO Sphere Decoders," IEEE Workshop on Signal Processing Systems, 2008. Washington, D.C. XP031361177, ISBN: 978-1-4244-2923-3, (Oct. 8, 2008), pp. 118-123., doi: 10.1109/SIPS.2008.4671748.
Tomasoni, Alessandro et al.: "Turbo-LORD: MAP-Approaching Soft-Input Soft-Output Detector for Iterative MIMO Receivers" IEEE GLOBECOM 2007 Proceedings, Global Telecommunications Conference. Piscataway, NJ, USA, (Nov. 1, 2007), pp. 3504-3508, XP031196593, ISBN: 978-1-4244-1042-2.

* cited by examiner

*Primary Examiner* — Curtis Odom
(74) *Attorney, Agent, or Firm* — Charles Chesney

(57) ABSTRACT

Certain embodiments of the present disclosure provide techniques for approximate computation of $l_2$ norms as a part of the maximum likelihood (ML) detection: tri-maxmin, maxsum and sortsum algorithms. The proposed approximation schemes show better accuracy than conventional approximation schemes—the abssum and maxmin algorithms, while the computational complexity is very similar. The error rate performance of the ML detection that utilizes proposed norm-approximation techniques are very close to the reference ML detection with exact calculation of $l_2$ norms, while the computational complexity is significantly smaller.

28 Claims, 12 Drawing Sheets

| OPERATION | TRI-MAXMIN | MAXSUM | SUM OF MAXMIN | ABSSUM | MAXMIN | SORTSUM |
|---|---|---|---|---|---|---|
| REAL ABS | 4 | 4 | 4 | 4 | 4 | 4 |
| REAL COMPARATOR | 3 | 3 | 2 | 0 | 5 | 5 |
| REAL SELECTOR | 6 | 3 | 4 | 0 | 8 | 10 |
| REAL ADDER | 3 | 5 | 3 | 3 | 1 | 5(4)* |
| TOTAL | 16 | 13 | 13 | 7 | 18 | 24(23)* |
| COMMENTS | ( )* : IN SORTSUM, 5 ADDERS ARE NEEDED FOR BETTER APPROXIMATION OR 4 ADDERS FOR A SLIGHTLY WORSE PERFORMANCE | | | | | |

FIG. 7

| OPERATION | RECOMMENDED TUNING FACTOR F FOR EACH APPROXIMATION | |
|---|---|---|
| | F VALUE | MSE[dB] |
| L1exact | 0.75 | -20.65 |
| L1abs | 0.50 | -12.21 |
| L2exact | NA | -Inf (this is reference) |
| L2maxmin | 1.25 | -15.09 |
| L2tmaxmin | 0.25 | -21.28 |
| L2maxsum | 0.25 | -23.28 |
| L2sortsum | [0.875000 0.437500 0.312500 0.125000] | -29.79 |

FIG. 8

| Items | PER performance loss [dB] | | |
|---|---|---|---|
| | Exact | Sortsum | Maxsum |
| Loss [dB] @PER 0.01: QAM64, TBCC, R=all | 0.00 | 0.02 | 0.06 |
| Loss [dB] @PER 0.01: QAM64, CTC, R=all | 0.00 | 0.02 | 0.05 |
| Loss [dB] @PER 0.01: QAM64, Both, R=all | 0.00 | 0.02 | 0.05 |
| Loss [dB] @PER 0.01: QAM64, TBCC, R=1/2 | 0.00 | 0.02 | 0.07 |
| Loss [dB] @PER 0.01: QAM64, TBCC, R=2/3 | 0.00 | 0.04 | 0.06 |
| Loss [dB] @PER 0.01: QAM64, TBCC, R=3/4 | 0.00 | -0.01 | 0.05 |
| Loss [dB] @PER 0.01: QAM64, TBCC, R=all | 0.00 | 0.02 | 0.06 |
| Loss [dB] @PER 0.01: QAM64, CTC, R=1/2 | 0.00 | 0.02 | 0.04 |
| Loss [dB] @PER 0.01: QAM64, CTC, R=2/3 | 0.00 | -0.03 | 0.01 |
| Loss [dB] @PER 0.01: QAM64, CTC, R=3/4 | 0.00 | 0.04 | 0.09 |
| Loss [dB] @PER 0.01: QAM64, CTC, R=5/6 | 0.00 | 0.02 | 0.09 |
| Loss [dB] @PER 0.01: QAM64, CTC, R=all | 0.00 | 0.01 | 0.06 |

FIG. 9

| Items | PER performance loss of each setting | | |
|---|---|---|---|
| | Exact | Sortsum | Maxsum |
| Loss [dB] @PER 0.01: QAM16, TBCC, R=all | 0.00 | 0.02 | 0.08 |
| Loss [dB] @PER 0.01: QAM16, CTC, R=all | 0.00 | 0.01 | 0.06 |
| Loss [dB] @PER 0.01: QAM16, Both, R=all | 0.00 | 0.01 | 0.07 |
| Loss [dB] @PER 0.01: QAM16, TBCC, R=1/2 | 0.00 | 0.01 | 0.08 |
| Loss [dB] @PER 0.01: QAM16, TBCC, R=3/4 | 0.00 | 0.03 | 0.09 |
| Loss [dB] @PER 0.01: QAM16, TBCC, R=all | 0.00 | 0.02 | 0.08 |
| Loss [dB] @PER 0.01: QAM16, CTC, R=1/2 | 0.00 | 0.01 | 0.05 |
| Loss [dB] @PER 0.01: QAM16, CTC, R=3/4 | 0.00 | 0.01 | 0.09 |
| Loss [dB] @PER 0.01: QAM16, CTC, R=all | 0.00 | 0.01 | 0.07 |

FIG. 10

| Items | PER performance loss of each setting | | | |
|---|---|---|---|---|
| | Exact | Sortsum | Maxsum | |
| Loss [dB] @PER 0.01: QPSK, TBCC, R=all | 0.00 | 0.03 | 0.09 | |
| Loss [dB] @PER 0.01: QPSK, CTC, R=all | 0.00 | 0.02 | 0.08 | |
| Loss [dB] @PER 0.01: QPSK, Both, R=all | 0.00 | 0.02 | 0.09 | |
| Loss [dB] @PER 0.01: QPSK, TBCC, R=1/2 | 0.00 | 0.04 | 0.10 | |
| Loss [dB] @PER 0.01: QPSK, TBCC, R=3/4 | 0.00 | 0.00 | 0.07 | |
| Loss [dB] @PER 0.01: QPSK, TBCC, R=all | 0.00 | 0.02 | 0.08 | |
| Loss [dB] @PER 0.01: QPSK, CTC, R=1/2 | 0.00 | 0.02 | 0.08 | |
| Loss [dB] @PER 0.01: QPSK, CTC, R=3/4 | 0.00 | 0.02 | 0.08 | |
| Loss [dB] @PER 0.01: QPSK, CTC, R=all | 0.00 | 0.02 | 0.08 | |

FIG. 11

METHODS AND SYSTEMS USING NORM APPROXIMATION FOR MAXIMUM LIKELIHOOD MIMO DECODING

CLAIM OF PRIORITY

This application claims the benefit of priority from U.S. Provisional Patent Application Ser. No. 61/105,008, filed Oct. 13, 2008 and entitled "Methods and systems for efficient norm approximation for maximum likelihood MIMO decoder," which is fully incorporated herein by reference for all purposes.

TECHNICAL FIELD

The present disclosure generally relates to communication, and more specifically to methods for approximate computation of metrics as a part of the maximum likelihood decoder.

SUMMARY

Certain embodiments provide a method for decoding data transmitted on a plurality of spatial channels in a multiple-input multiple-output wireless communications system. The method generally includes calculating non-squared norm metrics for a set of hypothesized symbols that correspond to coded bits transmitted over the spatial channels, searching the non-squared norm metrics for optimum metrics, squaring optimum metrics found during the searching to obtain post-squared metrics, and calculating log-likelihood ratio values for coded bits transmitted over the spatial channels using post-squared metrics.

Certain embodiments provide an apparatus for decoding data transmitted on a plurality of spatial channels in a multiple-input multiple-output wireless communications system. The apparatus generally includes logic for calculating non-squared norm metrics for a set of hypothesized symbols that correspond to coded bits transmitted over the spatial channels, logic for searching the non-squared norm metrics for optimum metrics, logic for squaring optimum metrics found during the searching to obtain post-squared metrics, and logic for calculating log-likelihood ratio values for coded bits transmitted over the spatial channels using post-squared metrics.

Certain embodiments provide an apparatus for decoding data transmitted on a plurality of spatial channels in a multiple-input multiple-output wireless communications system. The apparatus generally includes means for calculating non-squared norm metrics for a set of hypothesized symbols that correspond to coded bits transmitted over the spatial channels, means for searching the non-squared norm metrics for optimum metrics, means for squaring optimum metrics found during the searching to obtain post-squared metrics, and means for calculating log-likelihood ratio values for coded bits transmitted over the spatial channels using post-squared metrics.

Certain embodiments provide a computer-program product for decoding data transmitted on a plurality of spatial channels in a multiple-input multiple-output wireless communications system, comprising a computer readable medium having instructions stored thereon, the instructions being executable by one or more processors. The instructions generally include instructions for calculating non-squared norm metrics for a set of hypothesized symbols that correspond to coded bits transmitted over the spatial channels, instructions for searching the non-squared norm metrics for optimum metrics, instructions for squaring optimum metrics found during the searching to obtain post-squared metrics, and instructions for calculating log-likelihood ratio values for coded bits transmitted over the spatial channels using post-squared metrics.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

FIG. 7 shows a complexity comparison between several approximate algorithms for computation of norms in accordance with certain embodiments of the present disclosure.

FIG. 8 shows recommended values of tuning factors and corresponding mean square errors at signal-to-noise ratio (SNR) value of 0 dB for different approximate algorithms for computation of norms in accordance with certain embodiments of the present disclosure.

FIG. 9 shows an error rate performance loss in dB units of the PC-MLD with different approximate algorithms for computation of norms for Pedestrian A channel, 64-QAM modulation and at a packet error rate of 10-2 in accordance with certain embodiments of the present disclosure.

FIG. 10 shows an error rate performance loss in dB units of the PC-MLD with different approximate algorithms for computation of norms for Pedestrian A channel, 16-QAM modulation and at a packet error rate of 10-2 in accordance with certain embodiments of the present disclosure.

FIG. 11 shows an error rate performance loss in dB units of the PC-MLD with different approximate algorithms for computation of norms for Pedestrian A channel, QPSK modulation and at a packet error rate of 10-2 in accordance with certain embodiments of the present disclosure.

DETAILED DESCRIPTION

Figure 1:
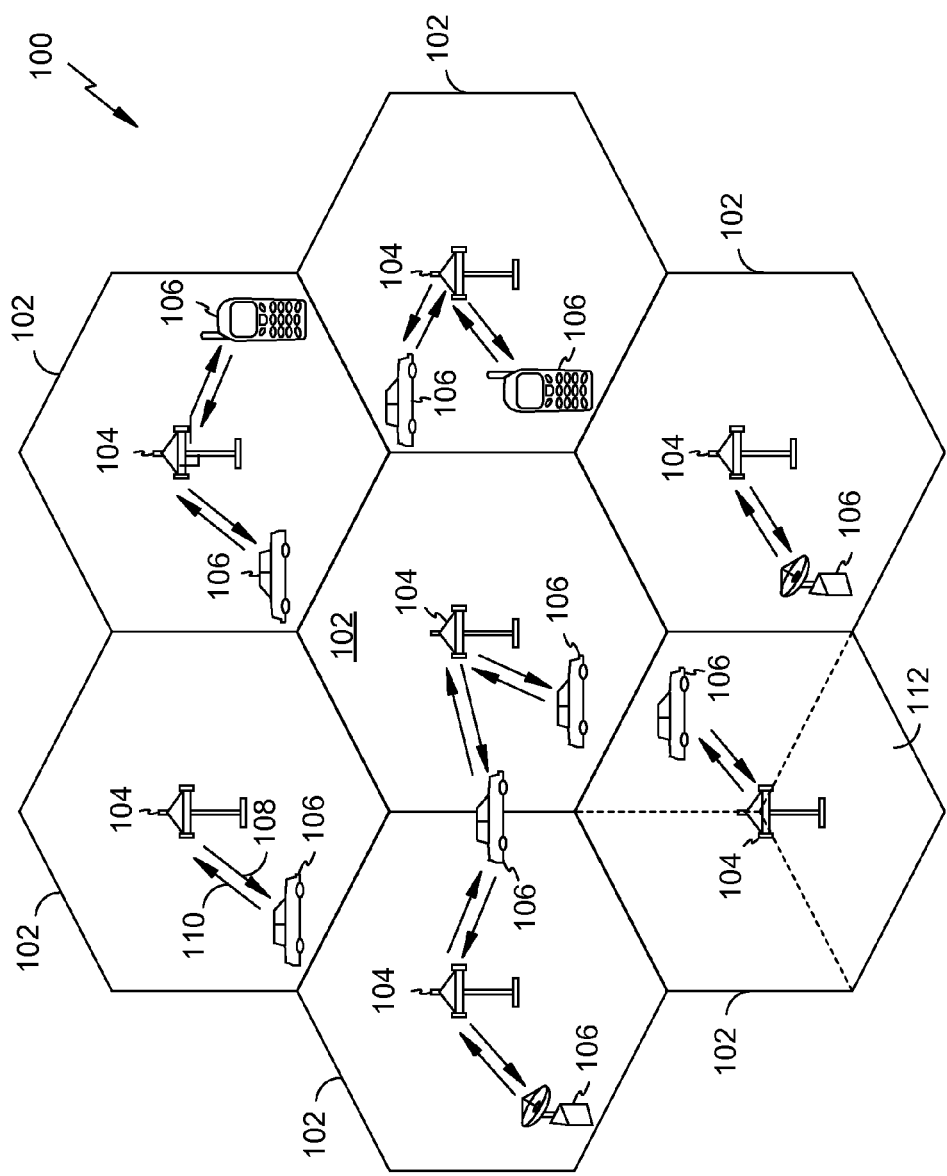
FIG. 1 illustrates an example wireless communication system, in accordance with certain embodiments of the present disclosure.

The word "exemplary" is used herein to mean "serving as an example, instance, or illustration." Any embodiment described herein as "exemplary" is not necessarily to be construed as preferred or advantageous over other embodiments.

A maximum likelihood (ML) multiple-input multiple-output (MIMO) decoding scheme requires "squared $l_2$ norm" as a metric for calculation of log-likelihood ratios (LLRs) of transmitted coded bits. A computational complexity of direct calculation of squared $l_2$ norms may be enormous, especially for high order modulation schemes and/or high dimensional MIMO systems (i.e. high number of transmit antennas). In order to reduce the computational complexity of LLR calculation, a "non-squared $l_2$ norms" can be utilized as the metric for obtaining LLRs of coded bits. The non-squared $l_2$ norms can be converted to the squared $l_2$ norms by applying a post squaring operations, which results into the ML detection with post-squaring compensation (the PC-MLD technique).

However, the computational complexity of obtaining exact non-squared $l_2$ norms may be higher than that of obtaining squared $l_2$ norms due to utilized square-root operations. On the other hand, computation of $l_2$ norms may be less complex than that of squared $l_2$ norms if some approximate algorithm is applied that does not utilize square-root operations.

Exemplary Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One specific example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

IEEE 802.16x is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas respectively.

FIG. 1 illustrates an example of a wireless communication system 100 in which embodiments of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink (DL) 108, and a communication link that facilitates transmission from a user terminal 106 to a base station 104 may be referred to as an uplink (UL) 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
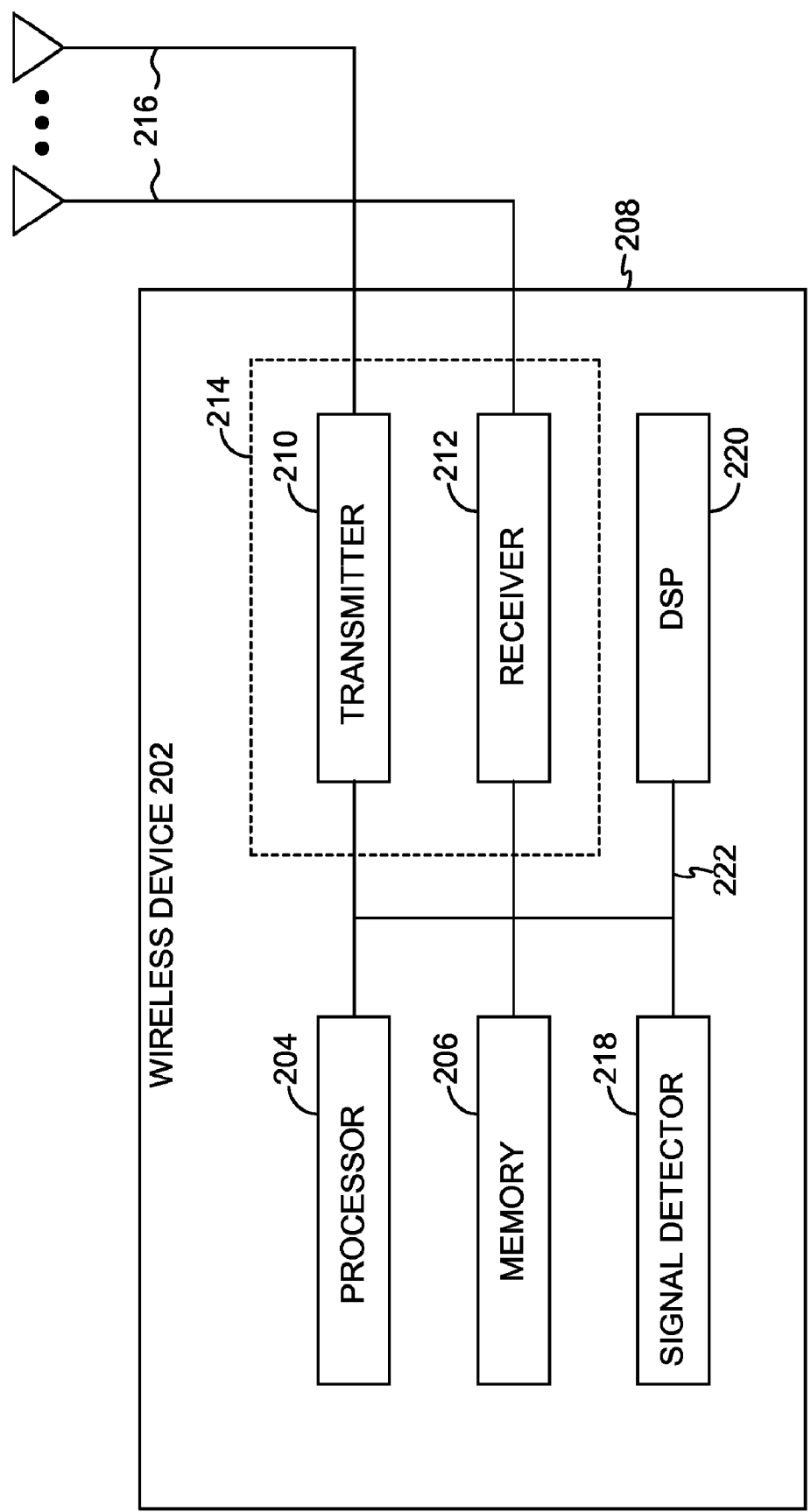
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. A plurality of transmit antennas 216 may be attached to the housing 208 and electrically coupled to the transceiver 214. The wireless device 202 may also include (not shown) multiple transmitters, multiple receivers, and multiple transceivers.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
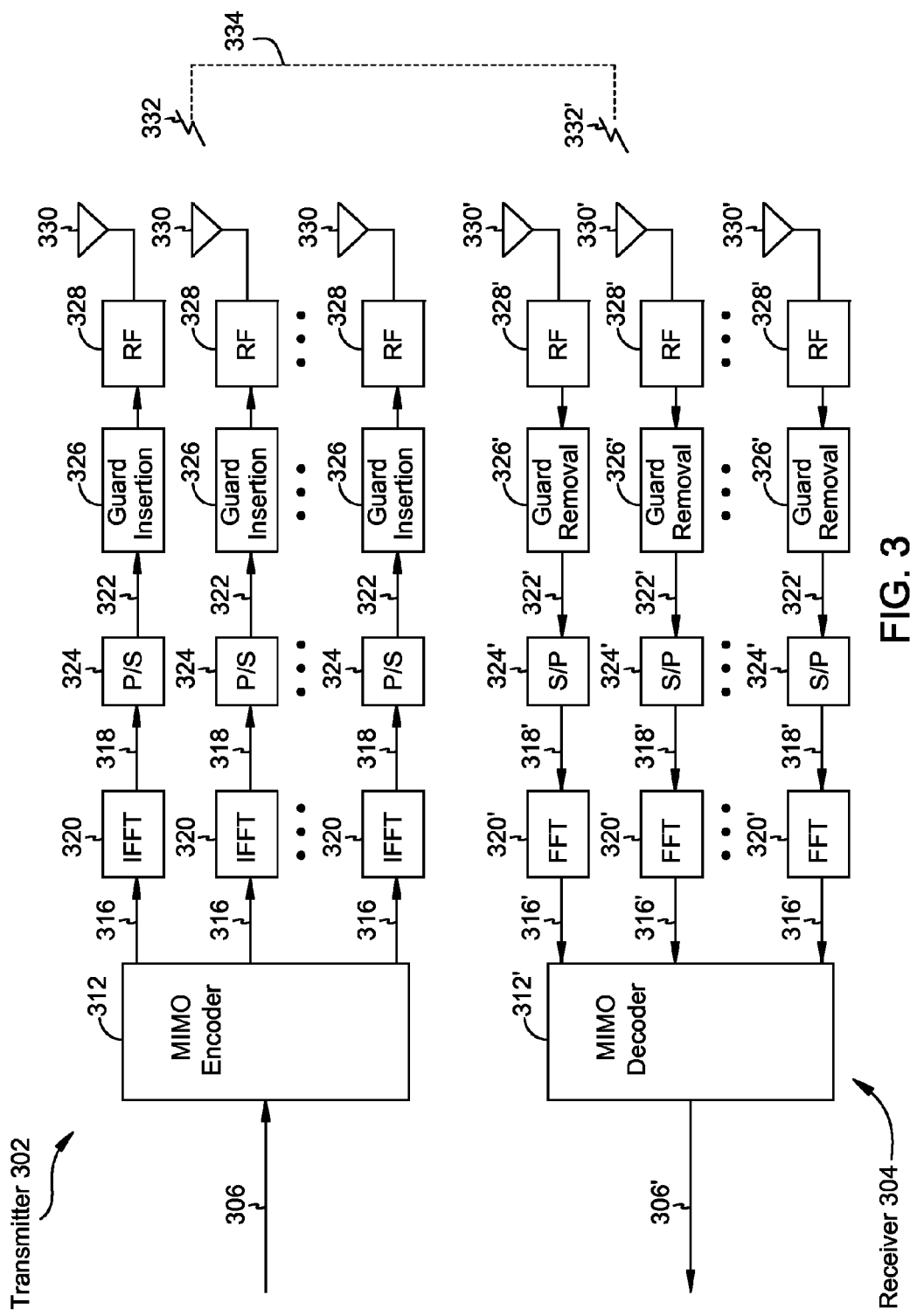
FIG. 3 illustrates an example transmitter and an example receiver that may be used within a wireless communication system in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to MIMO encoder 312. The MIMO encoder may encode the data 306 and map them onto M constellation points. The mapping may be done using some modulation constellation, such as binary phase-shift keying (BPSK), quadrature phase-shift keying (QPSK), 8 phase-shift keying (8PSK), quadrature amplitude modulation (QAM), etc, or null (zero valued) modulation if the sub-carrier is not assigned. Thus, the MIMO encoder 312 may output $N_{FFT}$ parallel symbol streams 316 per antenna path, each symbol stream 316 corresponding to $N_{FFT}$ orthogonal subcarriers of the inverse fast Fourier transforms (IFFTs) 320. These $N_{FFT}$ parallel symbol streams 316 are represented in the frequency domain and may be converted into $N_{FFT}$ parallel time domain sample streams 318 by IFFT components 320.

A brief note about terminology will now be provided. $N_T \times N_{FFT}$ parallel modulations in the frequency domain are equal to $N_T \times N_{FFT}$ modulation symbols in the frequency domain, which are equal to $N_T$ parallel $N_{FFT}$ mapping and $N_T$ parallel $N_{FFT}$-point IFFTs in the frequency domain, which is equal to $N_T$ (useful) OFDM symbols in the time domain, each of which is equal to $N_{FFT}$ samples in the time domain, where $N_T$ is the number of transmit antennas 330. After inserting Guard samples, one OFDM symbol in the time domain, NS, is equal to NCP (the number of guard samples per OFDM symbol)+$N_{FFT}$ (the number of useful samples per OFDM symbol) samples.

For one of $N_T$ antenna path, the $N_{FFT}$ parallel time domain sample streams 318 may be converted into an OFDM/OFDMA symbol stream 322 by parallel-to-serial (P/S) converter 324. Guard insertion component 326 may insert guard interval between successive OFDM/OFDMA symbols in the OFDM/OFDMA symbol stream 322 generating $N_S=N_{CP}+N_{FFT}$ samples. The signal from the guard insertion component 326 may then be up-converted to a desired transmit frequency band by a radio frequency (RF) front end component 328, and the antenna array 330 may then transmit the resulting signal 332 across multiple spatial subchannels 334.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a plurality of spatial subchannels 334. When a signal 332' is received by the antenna array 330', the received signal 332' may be downconverted to a baseband signal by RF front end components 328'. Guard removal components 326' may then remove the guard intervals that were inserted between OFDM/OFDMA symbols by the guard insertion components 326.

For one of $N_T$ antenna path, the output of the guard removal component 326' may be provided to S/P converter 324'. The S/P converter 324' may divide the OFDM/OFDMA symbol stream 322' into the $N_{FFT}$ parallel time-domain symbol streams 318', each of which corresponds to one of the $N_{FFT}$ orthogonal subcarriers. Fast Fourier transform (FFT) component 320' may convert the $N_{FFT}$ parallel time-domain symbol streams 318' into the frequency domain and output $N_{FFT}$ parallel frequency-domain symbol streams 316'.

A MIMO decoder 312' may perform the inverse of the encoding and symbol mapping operations that were performed by the MIMO encoder 312 thereby outputting the same number of data stream 306' as the data 306. Ideally, this data stream 306' corresponds to the data 306 that was provided as input to the transmitter 302. Note that elements 312', 316', 320', 318' and 324' may all be found in a baseband processor 340'.

Exemplary MIMO-OFDM System Model

Figure 4:
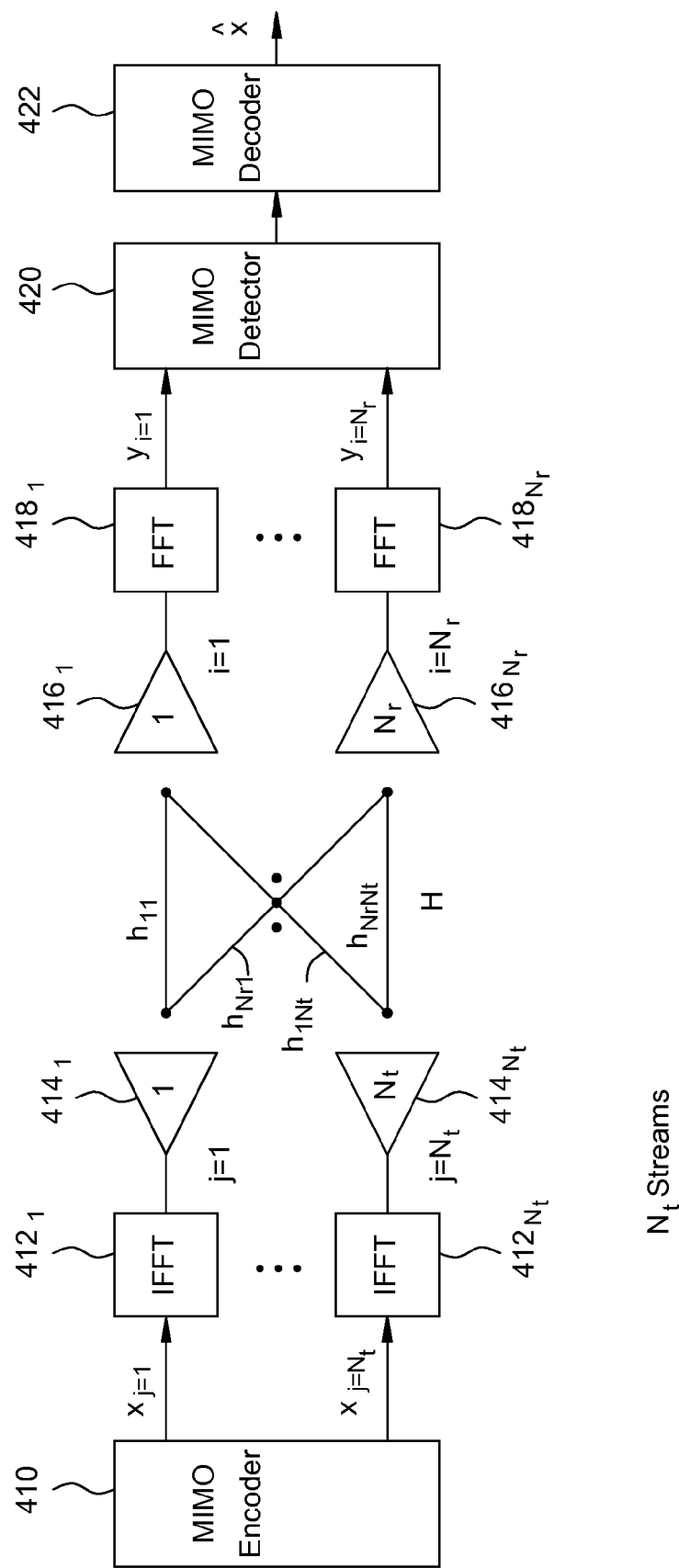
FIG. 4 illustrates a block diagram of a generic multiple-input multiple-output Orthogonal Frequency Division Multiplexing (MIMO-OFDM) wireless system in accordance with certain embodiments of the present disclosure.

FIG. 4 shows a block diagram of a generic multiple-input multiple-output (MIMO) OFDM wireless communication system with $N_t$ transmit and $N_r$ receive antennas. The system model for the kth sub-carrier (frequency subchannel) may be represented with linear equation:

$$y_k = H_k x_k + n_k, \quad k=1, 2, \ldots, N_{FFT}, \qquad (1)$$

where $N_{FFT}$ is the number of orthogonal sub-carriers (frequency bins) in MIMO-OFDM system.

In equations and accompanying disclosure below, the sub-carrier index k is omitted for simplicity. Therefore, the system model can be re-written using simpler notation as:

$$y = Hx + n, \qquad (2)$$

$$y = [y_1 \ y_2 \ \ldots \ y_{N_r}]^T, \qquad (3)$$

$$H = [h_1 \ h_2 \ \ldots \ h_{N_t}] = \begin{bmatrix} h_{11} & h_{12} & \ldots & h_{1N_t} \\ & \ldots & & \\ h_{N_r 1} & h_{N_r 2} & \ldots & h_{N_r N_t} \end{bmatrix}, \qquad (4)$$

where y is $[N_r \times 1]$ vector of received symbols, H is $[N_r \times N_t]$ matrix of channel gains and $h_j$ is its jth column vector that contains channel gains between the transmit antenna j and Nr receive antennas, x is $[N_t \times 1]$ transmitted symbol vector, n is $[N_r \times 1]$ complex noise vector with covariance matrix $E(nn^H)$.

As illustrated in FIG. 4, the transmission signal may be first encoded by the MIMO encoder 410. A redundancy may be included to protect the information data during the transmission over noisy wireless channels. The encoded signal may then be split into $N_t$ spatial data streams $x_1, x_2, \ldots, x_{N_t}$, as shown in FIG. 4. A plurality of spatial data streams can be converted into a time domain by utilizing the Inverse Fast Fourier Transform (IFFT) units $412_1, \ldots, 412_{N_t}$. The signal may then be up-converted to a desired transmission frequency band and transmitted from $N_t$ transmit antennas $414_1, \ldots, 414_{N_t}$ over $N_r \cdot N_t$ single-input single-output (SISO) channels.

Nr receive antennas $416_1, \ldots, 416_{N_r}$ are employed at the receiver. Received data streams can be converted back into a frequency domain by using the Fast Fourier Transform (FFT) units $418_1, \ldots, 418_{N_r}$. A frequency domain signal may be input into a MIMO detector 420 that generates reliability messages for coded bits transmitted over a plurality of spatial subchannels. A reliability message represents a probability that the particular transmitted coded bit is either bit "0" or bit "1". This information can be utilized by the outer MIMO channel decoder 422, and the estimated information data $\hat{x}$ for a plurality of spatial subchannels (transmit antennas) are available after removing the redundancy included at the transmitter.

Exemplary Vector NORM

For a given vector v, $l_p$ norm can be defined as:

$$v = [v_1 \ v_2 \ \ldots \ v_j \ \ldots \ v_N]^T \quad (7)$$

$$l_p = \|v\|_p \quad (8)$$
$$= (|v_1|^p + |v_2|^p \ldots + |v_N|^p)^{1/p}$$
$$= \left(\sum_{j=1}^{N} |v_j|^p\right)^{1/p},$$

where p is a real number with $p \geq 1$, and the scalar element $v_j$ can be either real or complex number.

The squared $l_p$ norm may be defined as follows:

$$\text{Squared } l_p = sl_p = l_p^2 = \|v\|_p^2. \quad (9)$$

The squared $l_2$ norms (parameter p=2) can be utilized for a metric computation as a part of the maximum likelihood detection.

Exemplary Maximum Likelihood Detection

The maximum likelihood (ML) detection is well-known technique in the art, which utilizes maximum a posteriori (MAP) or equivalent Log-MAP algorithm to determine the most likely transmitted modulation symbols. The ML detection can achieve optimal accuracy because it evaluates all modulation symbols that can be potentially transmitted. The Log-MAP detector uses log likelihood ratios (LLRs) of coded bits as reliability information to decide whether a bit "0" or a bit "1" is communicated between a transmitter and a receiver over a wireless channel.

If $b_k$ is the kth bit of the transmitted symbol vector x, the corresponding LLR $L(b_k)$ can be represented as follows:

$$L(b_k) = LLR(b_k | y) \quad (10)$$
$$= \log\left[\frac{P(b_k = 0 | y)}{P(b_k = 1 | y)}\right]$$
$$= \log\left[\frac{\sum_{x:b_k=0} P(x | y)}{\sum_{x:b_k=1} P(x | y)}\right]$$
$$= \log\left[\frac{\sum_{x:b_k=0} p(y | x)P(x)}{\sum_{x:b_k=1} p(y | x)P(x)}\right]$$
$$= \log\left[\frac{\sum_{x:b_k=0} p(y | x)}{\sum_{x:b_k=1} p(y | x)}\right]$$

where expression "x: $b_k$=0" denotes a set of candidate transmission bits x with the kth information bit equal to "0", expression "x: $b_k$=1" denotes a set of candidate transmission bits x with the kth information bit equal to "1", p(x) is a probability density function of candidate vector x, P(x) is a probability of x, and it is assumed that x is equally distributed.

The Gaussian probability density function may be associated with the transmission symbol vector x. In this case, expression (10) may be simplified as:

$$L(b_k) = LLR(b_k | y) \quad (11)$$
$$= \log\left[\frac{\sum_{x:b_k=0} p(y | x)}{\sum_{x:b_k=1} p(y | x)}\right]$$
$$= \log\left[\frac{\sum_{x:b_k=0} \exp(-d(x))}{\sum_{x:b_k=1} \exp(-d(x))}\right],$$

where metric d(x) may be defined as:

$$d(x) = d(x_1, \ldots x_j \ldots, x_{N_t}) \quad (12)$$
$$= \frac{\|y - Hx\|^2}{\sigma_n^2},$$

where $\sigma_n^2$ is a noise variance at the receiver. For the jth spatial data stream, $x_j \in C^{M=2^B}$ where M is the number of constellation points and B is a modulation order (number of bits per modulation symbol). The operational complexity of the detection algorithm given by equation (11) is proportional to $O(M^{N_t})$ and corresponds to the number of hypothesized transmission symbol vectors x in equation (11).

In order to reduce computational complexity of the Log-MAP approach, the Max-Log-MAP algorithm may be applied. If the Gaussian probability density function for the transmission symbol vector x is again assumed, the LLR for the kth bit of the transmission signal vector x $L(b_k)$ may be computed as:

$$L(b_k) = LLR(b_k | y) \quad (13)$$
$$= \log\left[\frac{\sum_{x:b_k=0} p(y | x)}{\sum_{x:b_k=1} p(y | x)}\right]$$
$$\approx \log\left[\frac{\max_{x:b_k=0} p(y | x)}{\max_{x:b_k=1} p(y | x)}\right]$$
$$= \log\left[\frac{\max_{x:b_k=0} \exp(-d(x))}{\max_{x:b_k=1} \exp(-d(x))}\right]$$
$$= \min_{x:b_k=1} d(x) - \min_{x:b_k=0} d(x).$$

The operational complexity of this approach is still proportional to $O(M^{N_t})$, but, as shown in expression (13), search operations may now be used instead of summation operations of the Log-MAP approach given by equation (11).

As shown by equation (12), calculation of LLRs in both Log-MAP and the Max-Log-MAP techniques may be based on $l_2^2$ norms. Assuming unitary noise variance at the receiver (after pre-whitening, for example), the cth metric $d_c$ from equations (11)-(13) may be represented as:

$$d_c = l_2^2 = \|v\|_2^2$$

where, $v=y-Hx$, c=1, 2, ..., $M^{N_t}$. \quad (14)

Exemplary Maximum Likelihood Dection with Non-Squared NORMS

The Max-Log-MAP ML detection with post-squaring compensation of norms (hereinafter abbreviated as the PC-MLD) may be applied to reduce a computational complexity of the conventional Max-Log-MAP MLD algorithm while preserving the error-rate performance of the conventional ML detection. In the PC-MLD approach, the transmission signal may be hypothesized based on non-squared $l_2$ norms instead of squared $l_2$ norms, and then the searching for minima non-squared distances may be performed. A squaring of metrics may be postponed until minima non-squared norms are determined. By computing non-squared norms and by post-squaring only a limited number of calculated metrics, computational complexity may be reduced, while identical detection accuracy can be achieved as for the conventional Max-Log-MAP ML solution.

Once the minima metrics for all coded bits are determined, the post-squaring compensation of minima metrics may be performed. The post-squaring of minima metrics produces identical results as minima metrics of the original ML detection, i.e. $l_2^2$ norms are equivalent to the post-squared $l_2$ norms.

From equation (14), the relationship between $l_2^2$ norm and $l_2$ norm may be obtained as follows:

$$d_c = l_2^2 = \|v\|_2^2 \qquad (15)$$
$$= \left(\sqrt{\sum_{j=1}^{N_t} |v_j|^2}\right)^2$$
$$= (d_{l_2,c})^2 = (l_2)^2$$

where, $v = y - Hx$, $c = 1, 2, \ldots, M^{N_t}$.

The post squaring of minima metric may be applied to recover squared $l_2$ norms required for calculation of LLRs of coded bits. Let $d_{l_d,min}$ be the arbitrary minimum $l_2$ norm as a result of minima search:

$$d_{l_2,min} = \min(d_{l_2,c}). \qquad (16)$$

The post-squaring of the smallest $l_2$ norm results into equivalent minimum $l_2^2$ norm:

$$d_{min} = (d_{l_2,min})^2 \qquad (17)$$
$$= \left(\min_x(\|v\|_2)\right)^2$$
$$= \left(\min_x\left(\sqrt{\sum_{j=1}^{N_t} |v_j|^2}\right)\right)^2$$
$$= \min_x\left(\left(\sqrt{\sum_{j=1}^{N_t} |v_j|^2}\right)^2\right)$$
$$= \min_x(\|v\|_2^2).$$

Therefore, if no approximation for calculation of $l_2$ norms is utilized, then the result of minima search algorithm using $l_2$ norms is equivalent to the result of minima search using directly computed $l_2^2$ norms.

Figure 5:
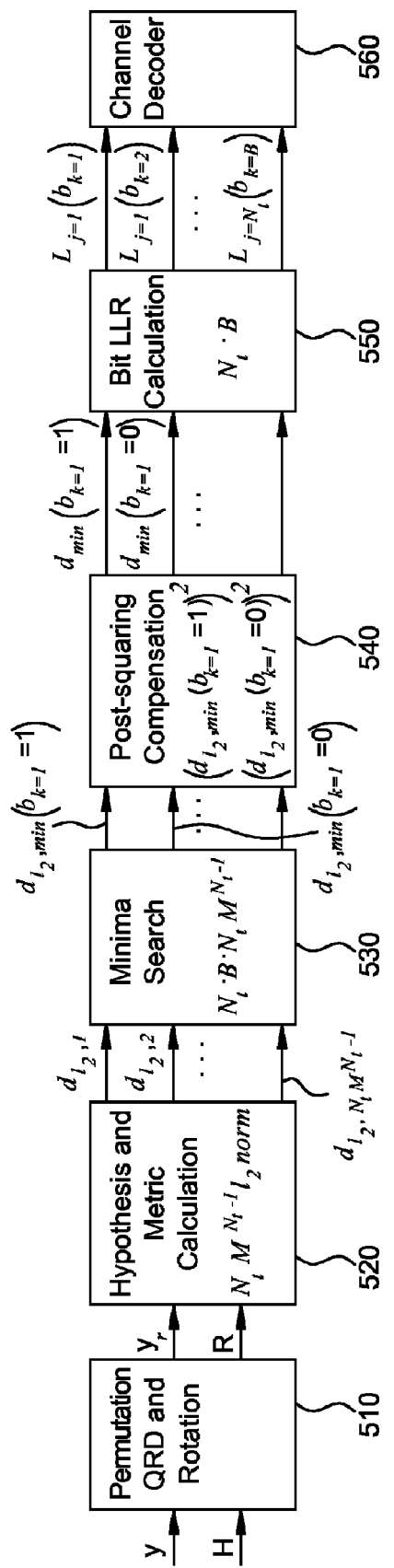
FIG. 5 shows a block diagram of a maximum likelihood detector with post-squaring compensation (PC-MLD) in accordance with certain embodiments of the present disclosure.

The post-squaring compensation may be applied as a part of the ML detection with a QR preprocessing. FIG. 5 shows a block diagram of the Max-Log-MAP ML detector with post-squaring compensation and the QR preprocessing. For every spatial data stream $j=1, 2, \ldots, N_t$, the channel matrix may be permuted by unit 510 such that the rightmost column of a permuted matrix corresponds to the jth decoded spatial stream. The QR decomposition of the permuted channel matrix can be then performed, and unitary matrix Q and upper triangular matrix R may be obtained. The vector of received symbol may be rotated by applying the unitary matrix Q, which is equivalent to the zero-forcing (ZF) filtering.

For every spatial data stream $I=1, 2, \ldots, N_t$, one rotated spatial data stream may be sliced by unit 520 to obtain estimated modulation symbols for that particular spatial data stream j. All other ($N_t-1$) spatial data streams may be hypothesized with all possible transmission symbols. Therefore, unit 520 calculates $N_t \cdot M^{N_t-1}$ metrics based on $l_2$ norms. One approximate algorithm among a plurality of proposed algorithms from the present disclosure may be applied to calculate non-squared $l_2$ norms. Subsequently, for every transmission bit $k=1, 2, \ldots, N_t \cdot B$, unit 530 performs search for minima metrics for all signal-vector hypotheses x for which bit k is equal to bit "0", and for all hypotheses x for which bit k is equal to bit "1". Computational complexity of this candidate search process is therefore proportional to $O(N_t \cdot B \cdot N_t \cdot M^{N_t-1})$.

Once the minima metrics for all coded bits are determined, unit 540 may perform the post-squaring compensation of minima metrics. As shown before, the post-squaring of minima metrics produces identical results as minima metrics of the original ML detection, i.e. directly computed $l_2^2$ norms are equivalent to post-squared $l_2$ norms if no approximation for calculating $l_2$ norms is utilized. For every coded transmission bit $k=1, 2, \ldots, N_t \cdot B$, the LLR $L(b_k)$ may be calculated by unit 550 based on squared minima metrics as follows:

$$L(b_k) = \log\left[\frac{\max_{x:b_k=0} \exp(-d(x))}{\max_{x:b_k=1} \exp(-d(x))}\right] \qquad (18)$$
$$= \min_{x:b_k=1} d(x) - \min_{x:b_k=0} d(x)$$
$$= \log\left[\frac{\max_{x:b_k=0} \exp(-(d_{l_2}(x))^2)}{\max_{x:b_k=1} \exp(-(d_{l_2}(x))^2)}\right]$$
$$= \left(\min_{x:b_k=1} d_{l_2}(x)\right)^2 - \left(\min_{x:b_k=0} d_{l_2}(x)\right)^2.$$

Assuming unitary variance of the effective noise at the receiver (after pre-whitening, for example), the cth metric $d_{l_2,c}$ from the metric calculation block 520 may be determined as:

$$d_{l_2,c} = l_2 = \|v\|_2$$

where, $v = y_r - Rx$, $c=1, 2, \ldots, N_t M^{N_t-1}$. (19)

Calculated LLRs for all $N_t \cdot B$ coded bits transmitted over a plurality of spatial subchannels may be utilized by the outer channel decoder 560, which generates decoded information bits at its output.

Exemplary Techniques for Approximate Computation of Non-Squared NORMS

It can be observed from equations (8) and (19) that the ML detection with post-squaring compensation may require a higher computational complexity than the original approach based on direct computation of $l_2^2$ norms due to square-root operations. However, this holds only if the exact non-squared $l_2$ norms are calculated. The computational complexity of the ML detection with post-squaring compensation may be significantly reduced if approximate algorithms for calculation of $l_2$ norms are applied that do not utilize square-root operations.

In the present disclosure, several $l_2$ norm approximation schemes are proposed, in particular: tri-maxmin, maxsum and sortsum approximation algorithms. It can be shown that proposed approximate techniques for computation of $l_2$ norms show better error rate performance than conventional approximate algorithms such as abssum or maxmin techniques. The error rate performance of the ML MIMO decoder using one of the proposed approximate schemes for computation of $l_2$ norms are very close to the error rate performance of the reference ML MIMO decoder that utilizes the exact calculation of $l_2$ norms. In the same time, the computational complexity is substantially reduced.

As an illustrative example, a wireless system with two transmit and two receive antennas may be assumed. Then, the following norm-vector may be considered according to equation (7):

$$v = [v_1 v_2]^T. \qquad (20)$$

The complex vector from equation (20) may also be denoted by the vector z composed of real elements:

$$z = [\text{real}(v_1), \text{imag}(v_1), \text{real}(v_2), \text{imag}(v_2)]^T \qquad (21)$$
$$= [z_1, z_2, z_3, z_4]^T.$$

The exact $l_2$ norm may be then computed as:

$$l_{2,exact} = \|v\|_2 \qquad (22)$$
$$= \sqrt{|v_1|^2 + |v_2|^2}$$
$$= \sqrt{|z_1|^2 + |z_2|^2 + |z_3|^2 + |z_4|^2}.$$

For one embodiment of the present disclosure, a tri-maxmin approximate algorithm may be utilized for computation of $l_2$ norms. Equation (22) may be rewritten as:

$$l_{2,exact} = \sqrt{|v_1|^2 + |v_2|^2} \qquad (23)$$
$$= \sqrt{\left(\sqrt{|z_1|^2 + |z_2|^2}\right)^2 + \left(\sqrt{|z_3|^2 + |z_4|^2}\right)^2}.$$

Based on equation (23), $l_2$ norm may be approximately computed using the tri-maxmin algorithm with maxmin approximation:

$$l_{2,t\,max\,min} = \text{maxmin}(\text{maxmin}(|z_1|,|z_2|),\text{maxmin}(|z_3|,|z_4|)), \qquad (24)$$

where maxmin may be given as the following expression with tuning factor F:

$$\text{maxmin}(a,b) = \max(a,b) + F \cdot \min(a,b). \qquad (25)$$

The tuning factor F of 0.25 may be employed considering accuracy of the approximate algorithms and implementation complexity.

The tuning factor F may be adjusted to control the accuracy of the proposed algorithm. For example, accuracy of the proposed tri-maxmin algorithm may be reduced if the tuning factor F is not applied in equation (25). The chosen value of the tuning factor of 0.25 may provide sufficient accuracy of the proposed approximate algorithm, with relatively low computational complexity since the multiplication by the tuning factor of 0.25 from equation (25) can be efficiently implemented with a simple right shift operation by two bit-positions.

For another embodiment of the present disclosure, a sortsum algorithm may be utilized for approximate computation of $l_2$ norms. In the sort-sum approach, a linear combination of sorted vector elements can be utilized to approximate computation of $l_2$ norm, as given by:

$$s = \text{sort}(|z|,\text{'descending order'}), \qquad (26)$$

$$l_{2,sortsum} = \sum_j F_j \cdot s_j \qquad (27)$$

where $s_j$ is a sorted version of $|z_j|$ in descending order. The following tuning factors may be applied considering accuracy of the approximate algorithm and implementation complexity:

$$F_j = [0.875\ 0.5\ 0.25\ 0.125] \text{ or }$$

$$F_j = [0.875\ 0.4375\ 0.3125\ 0.125]. \qquad (28)$$

For yet another embodiment of the present disclosure, the exact computation of $l_2$ norms given by equation (22) may be approximated by applying a maxsum algorithm. For the sort-sum approximation given by equations (26)-(27), a linear combination of sorted vector elements may be utilized. A more simplified version of the sortsum approximation called the maxsum algorithm may be applied, as given by:

$$l_{2,maxsum} = \max(|z_j|) + F \cdot \left(\sum_{j,j \neq m} |z_j|\right) \qquad (29)$$
$$= \max(|z_j|) + F \cdot \left(\left(\sum_j |z_j|\right) - \max(|z_j|)\right)$$

where $m = \underset{j}{\text{argmax}}(|z_j|)$.

The tuning factor F of 0.25 may be utilized considering accuracy of the approximate algorithm and implementation complexity.

Figure 6:
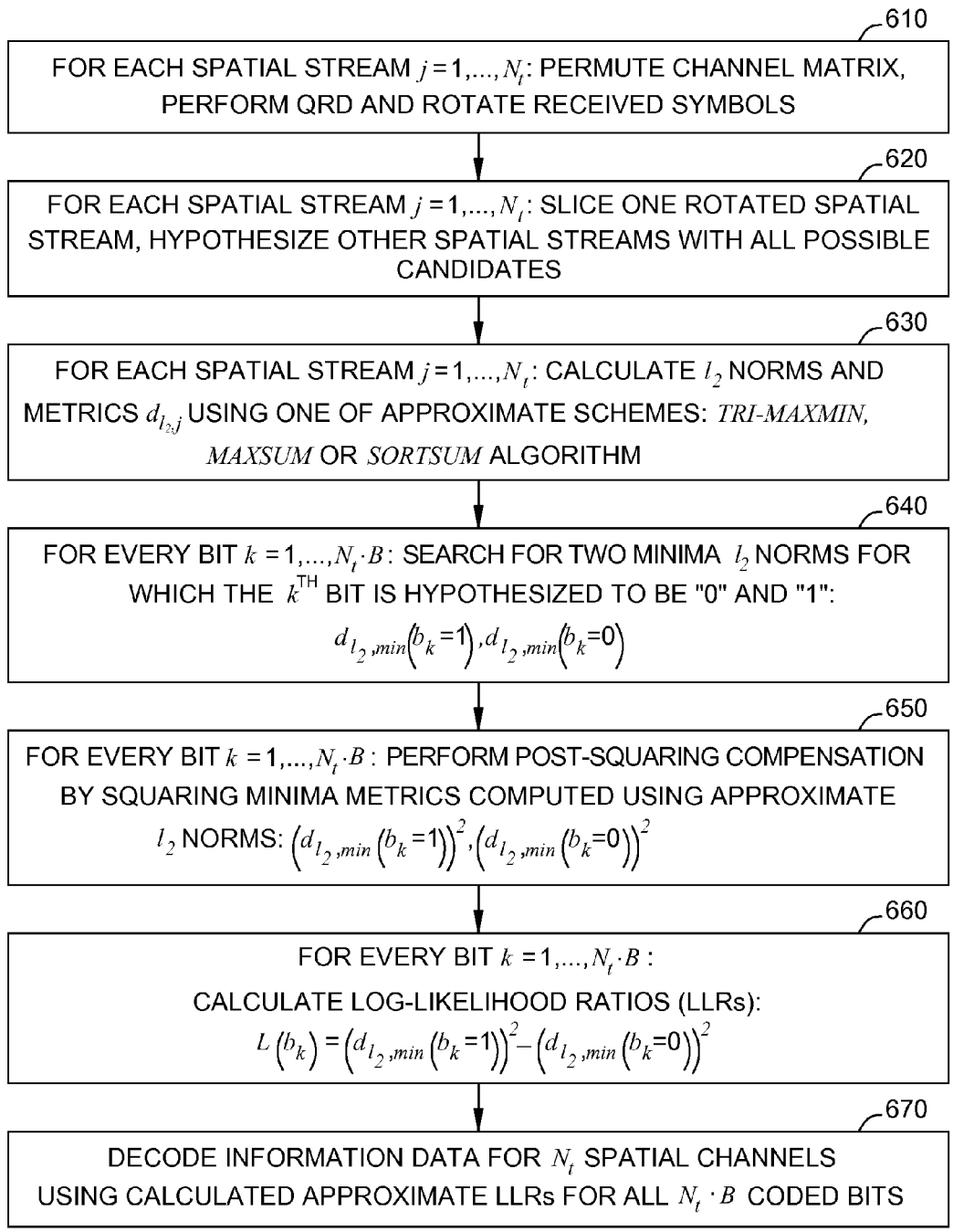
FIG. 6 shows a process of performing the maximum likelihood detection with approximate computation of $l_2$ norms and post-squaring compensation in accordance with certain embodiments of the present disclosure.

FIG. 6 shows a process of the Max-Log-MAP PC-MLD with approximate computation of $l_2$ norms. At 610, for every spatial data stream $j=1, 2, \ldots, N_t$, the channel matrix may be permuted such that the rightmost column of the permuted matrix corresponds to the jth decoded stream. The QR decomposition of permuted channel matrix for every utilized spatial data stream is then performed, and the vector of received symbol may be rotated by applying the zero-forcing (ZF) technique.

At 620, for every spatial data stream $j=1, 2, \ldots, N_t$, one rotated spatial stream may be sliced in order to obtain estimated modulation symbols for that particular spatial data stream j. All other ($N_t-1$) spatial data streams may be hypothesized with all possible transmission symbols. At 630, $N_t \cdot M^{N_t-1}$ metrics based on $l_2$ norms may be calculated by utilizing one of the proposed approximation techniques: tri-maxmin, maxsum or sortsum algorithm. At 640, for every transmission bit $k=1, 2, \ldots, N_t \cdot B$, a search for minima metrics may be performed for all signal-vector hypotheses x for which bit k is equal to bit "0", and for all hypotheses x for which bit k is equal to bit "1".

At 650, once the minima metrics for all coded bits are determined, the post-squaring compensation of minima metrics may be performed. At 660, for every coded transmission bit k=1, 2, ..., $N_t \cdot B$, LLR $L(b_k)$ may be calculated based on squared minima metrics as given by equation (18). At 670, calculated LLRs for all $N_t \cdot B$ coded bits transmitted over a plurality of spatial subchannels for a single frequency bin may be passed to outer channel decoding and utilized for generating decoded information bits.

For the comparison purpose, an approximate computation of $l_1$ norm is also provided, as well as techniques for approximate computation of $l_2$ norm from the prior art. According to equation (8) the exact $l_1$ norm may be computed as:

$$l_{1,exact} = \|v\|_1 \quad (30)$$
$$= |v_1| + |v_2|.$$

Equation (30) may be rewritten as:

$$l_{1,exact} = |v_1| + |v_2| \quad (31)$$
$$= \sqrt{|z_1|^2 + |z_2|^2} + \sqrt{|z_3|^2 + |z_4|^2}.$$

Then, $l_1$ norm can be approximated by the sum of maxmin functions using the following maxmin approximation:

$$l_{1,s\,max\,min} = \text{maxmin}(|z_1|,|z_2|) + \text{maxmin}(|z_3|,|z_4|). \quad (32)$$

The well-known abssum approximation may be represented as:

$$l_{1,abssum}(\text{or } l_{2,abssum}) = F \cdot \sum_j |z_j|. \quad (33)$$

The conventional maxmin approximation with four real elements may be represented as an extension of the maxmin approximation with two real elements:

$$l_{2,max\,min} = \max(|z_1|,|z_2|,|z_3|,|z_4|) + F \cdot \min(|z_1|,|z_2|,|z_3|,|z_4|). \quad (34)$$

Exemplary Determination of Tuning Factors for Approximate Computation of NORM Metrics

As previously described, the tuning factor F may be utilized to improve the accuracy of approximate computation of $l_2$ norms. The optimal tuning factor may be determined by calculating the minimum mean square error (MMSE) between the exact norm value and the approximated norm value.

The MIMO signal from FIG. 4 can be modeled as:

$$y = Hx + n, \quad (35)$$

where y is $[N_r \times 1]$ received symbol vector, H is $[N_r \times N_t]$ channel matrix, x is $[N_t \times 1]$ transmit symbol vector with covariance matrix $E(x^H x) = 1$ and x is randomly distributed in a given constellation space, and n is $[N_r \times 1]$ complex white Gaussian noise vector with covariance matrix $E(n^H n)$.

In the case of ML decoding, squared $l_2$ norms may be computed for all possible values of x as:

$$d = \|v\|_2^2 = \|y - \hat{H}x\|_2^2, \quad (36)$$

where $\hat{H}$ is a matrix of estimated channel gains.

On the other hand, in the case of PC-MLD, the $l_2$ norm for all possible values of x may be calculated as:

$$d_{l_2}(x) = \|v\|_2 = \|y - \hat{H}x\|_2. \quad (37)$$

Assuming that the channel is known, the error vector signal model may be given as:

$$v \approx \begin{cases} n & \text{if } a = t, x_t \in x, x_a \in x \\ n + H(x_t - x_{a \neq t}) & \text{else,} \end{cases} \quad (38)$$

where $x_t$ is a transmission symbol vector at a given time t and $x_a$ is any arbitrary symbol vector in symbol-vector x, and n is a complex white Gaussian noise. The second term of equation (38) in the case of $a \neq t$ may be only considered as an offset value that represents a multiplication of a random channel matrix and the difference of any two constellation points. The optimal tuning factor for approximate computation of $l_2$ norms may be obtained in an effort to minimize the error vector from equation (38).

Exemplary Complexity Comparison of Different NORM Approximation Techniques

FIG. 7 shows a complexity comparison between several schemes for approximate computation of $l_2$ norms. It may be assumed that the tuning factor is equal to 2−n, where n is an integer. In this way, implementation complexity of the approximate algorithm for computation of $l_2$ norms may be reduced, while the accuracy is not sacrificed.

The bit width and memory requirements of different norm approximation schemes are not considered for this particular comparison of computational complexity. It is also important to note that in the proposed sortsum approximation, five adders may be required for better approximation accuracy, while four adders may be sufficient to achieve a slightly worse performance.

Exemplary Simulation Results

Simulation results are presented in this disclosure for different approximate algorithms for computation of $l_2$ norms. FIG. 8 shows recommended values of tuning factors and corresponding mean square errors (MSE) at a signal-to-noise ratio (SNR) of 0 dB for different norm approximation schemes. As an illustrative example, a wireless system with two transmit/receive antennas may be considered, Additive White Gaussian Noise (AWGN) channels may be assumed, and 64-QAM modulation may be applied at the transmitter.

FIGS. 9-11 show error rate performance loss in dB units of the Max-Log-MAP PC-MLD with different approximate techniques for computation of $l_2$ norms in Pedestrian A channels where the speed of mobile subscriber is 3 km/h, while the 64-QAM, 16-QAM and QPSK modulations are respectively applied, and the packet error rate of 10-2 is assumed. 50,000 data packets are used for simulations, tailbiting convolutional codes (TBCC) of rate 1/2, 2/3 and 3/4 and/or convolutional Turbo codes (CTC) of rate 1/2, 2/3 and 5/6 can be applied. It is assumed perfect channel knowledge at the receiver.

The following schemes are evaluated by simulations: the Max-Log-MAP PC-ML detection with exact $l_2$ norm calculation, the Max-Log-MAP PC-ML detection with the proposed sortsum approximate algorithm with tuning factor F=[0875 04375 0.3125 0.125], and the Max-Log-MAP PC-ML detection with the proposed maxsum approximate algorithm with tuning factor of 0.25. It can be observed from FIGS. 9-11 that the averaged performance loss considering all code rates and modulation types is only about 0.01~0.03 dB for the sortsum approximation and about 0.05~0.09 dB for the maxsum approximation compared to the exact $l_2$ norm calculation approach.

Figure 6A:
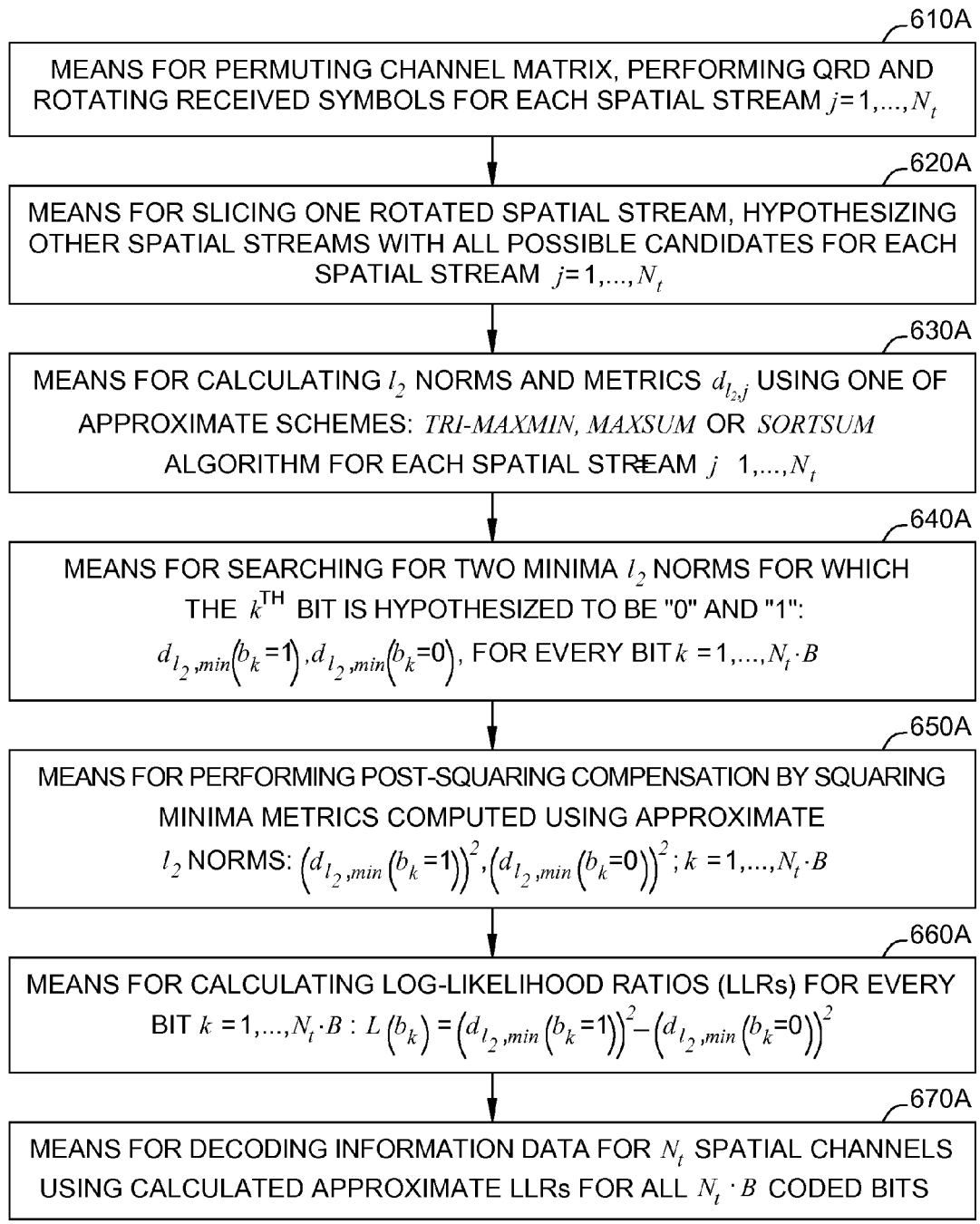
FIG. 6A illustrates example components capable of performing the operations illustrated in FIG. 6.

The various operations of methods described above may be performed by various hardware and/or software component(s) and/or module(s) corresponding to means-plus-function blocks illustrated in the Figures. For example, blocks 610-670 illustrated in FIG. 6 correspond to means-plus-function blocks 610A-670A illustrated in FIG. 6A. More generally, where there are methods illustrated in Figures having corresponding counterpart means-plus-function Figures, the operation blocks correspond to means-plus-function blocks with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for decoding data transmitted on a plurality of spatial channels in a multiple-input multiple-output wireless communications system, comprising:
   calculating non-squared $l_2$ norm metrics for a set of hypothesized symbols that correspond to coded bits transmitted over the spatial channels;
   searching the non-squared $l_2$ norm metrics for optimum metrics;
   squaring optimum metrics found during the searching to obtain post-squared metrics; and
   calculating log-likelihood ratio values for coded bits transmitted over the spatial channels using post-squared metrics.

2. The method of claim 1, wherein calculating un-squared $l_2$ norm metrics for a set of hypothesized symbols that correspond to coded bits transmitted over the spatial channels comprises:
   utilizing approximated $l_2$ norm values.

3. The method of claim 1 further comprising:
   computing approximate $l_2$ norm values using an approximation technique selected from a group of approximation techniques, the group of approximation techniques including tri-maxmin approximation, sortsum approximation, and maxsum approximation.

4. The method of claim 3 further comprising:
   tuning at least one factor that affects an accuracy of the approximation technique.

5. The method of claim 1, wherein searching the un-squared $l_2$ norm metrics for optimum metrics comprises:
   searching the non-squared $l_2$ norm metrics for minima.

6. The method of claim 1 further comprising:
   permuting a matrix of channel estimates for the spatial channels, to generate permuted matrices of channel estimates for the plurality of spatial streams; and performing QR decomposition of the permuted matrices to generate a unitary matrix and an upper triangular matrix for the plurality of spatial streams.

7. The method of claim 6 further comprising:
rotating a received signal with the unitary matrices to generate filtered outputs;
slicing filtered outputs to obtain sliced coded bits for the plurality of spatial streams;
hypothesizing symbols that may be transmitted on the spatial streams using sliced coded bits; and
decoding bits transmitted over the plurality of spatial sub-channels by using calculated log-likelihood ratios of coded bits.

8. An apparatus for decoding data transmitted on a plurality of spatial channels in a multiple-input multiple-output wireless communications system, comprising:
logic for calculating non-squared $l_2$ norm metrics for a set of hypothesized symbols that correspond to coded bits transmitted over the spatial channels;
logic for searching the non-squared $l_2$ norm metrics for optimum metrics;
logic for squaring optimum metrics found during the searching to obtain post-squared metrics; and
logic for calculating log-likelihood ratio values for coded bits transmitted over the spatial channels using post-squared metrics.

9. The apparatus of claim 8, wherein the logic for calculating un-squared $l_2$ norm metrics for a set of hypothesized symbols that correspond to coded bits transmitted over the spatial channels comprises:
logic for utilizing approximated $l_2$ norm values.

10. The apparatus of claim 8 further comprising:
logic for computing approximate $l_2$ norm values using an approximation technique selected from a group of approximation techniques, the group of approximation techniques including tri-maxmin approximation, sort-sum approximation, and maxsum approximation.

11. The apparatus of claim 10 further comprising:
logic for tuning at least one factor that affects an accuracy of the approximation technique.

12. The apparatus of claim 8, wherein the logic for searching the un-squared $l_2$ norm metrics for optimum metrics comprises:
logic for searching the non-squared $l_2$ norm metrics for minima.

13. The apparatus of claim 8 further comprising:
logic for permuting a matrix of channel estimates for the spatial channels, to generate permuted matrices of channel estimates for the plurality of spatial streams; and
logic for performing QR decomposition of the permuted matrices to generate a unitary matrix and an upper triangular matrix for the plurality of spatial streams.

14. The apparatus of claim 13 further comprising:
logic for rotating a received signal with the unitary matrices to generate filtered outputs;
logic for slicing filtered outputs to obtain sliced coded bits for the plurality of spatial streams;
logic for hypothesizing symbols that may be transmitted on the spatial streams using sliced coded bits; and
logic for decoding bits transmitted over the plurality of spatial sub-channels by using calculated log-likelihood ratios of coded bits.

15. An apparatus for decoding data transmitted on a plurality of spatial channels in a multiple-input multiple-output wireless communications system, comprising:

means for calculating non-squared $l_2$ norm metrics for a set of hypothesized symbols that correspond to coded bits transmitted over the spatial channels;
means for searching the non-squared $l_2$ norm metrics for optimum metrics;
means for squaring optimum metrics found during the searching to obtain post-squared metrics; and
means for calculating log-likelihood ratio values for coded bits transmitted over the spatial channels using post-squared metrics.

16. The apparatus of claim 15, wherein the means for calculating un-squared $l_2$ norm metrics for a set of hypothesized symbols that correspond to coded bits transmitted over the spatial channels comprises:
means for utilizing approximated $l_2$ norm values.

17. The apparatus of claim 15 further comprising:
means for computing approximate $l_2$ norm values using an approximation technique selected from a group of approximation techniques, the group of approximation techniques including tri-maxmin approximation, sort-sum approximation, and maxsum approximation.

18. The apparatus of claim 17 further comprising:
means for tuning at least one factor that affects an accuracy of the approximation technique.

19. The apparatus of claim 15, wherein the means for searching the un-squared $l_2$ norm metrics for optimum metrics comprises:
means for searching the non-squared $l_2$ norm metrics for minima.

20. The apparatus of claim 15 further comprising:
means for permuting a matrix of channel estimates for the spatial channels, to generate permuted matrices of channel estimates for the plurality of spatial streams; and
means for performing QR decomposition of the permuted matrices to generate a unitary matrix and an upper triangular matrix for the plurality of spatial streams.

21. The apparatus of claim 20 further comprising:
means for rotating a received signal with the unitary matrices to generate filtered outputs;
means for slicing filtered outputs to obtain sliced coded bits for the plurality of spatial streams;
means for hypothesizing symbols that may be transmitted on the spatial streams using sliced coded bits; and
means for decoding bits transmitted over the plurality of spatial sub-channels by using calculated log-likelihood ratios of coded bits.

22. A computer-program product for decoding data transmitted on a plurality of spatial channels in a multiple-input multiple-output wireless communications system, comprising a non-transitory computer readable medium having instructions stored thereon, the instructions being executable by one or more processors and the instructions comprising:
instructions for calculating non-squared $l_2$ norm metrics for a set of hypothesized symbols that correspond to coded bits transmitted over the spatial channels;
instructions for searching the non-squared $l_2$ norm metrics for optimum metrics;
instructions for squaring optimum metrics found during the searching to obtain post-squared metrics; and
instructions for calculating log-likelihood ratio values for coded bits transmitted over the spatial channels using post-squared metrics.

23. The computer-program product of claim 22, wherein the instructions for calculating un-squared $l_2$ norm metrics for a set of hypothesized symbols that correspond to coded bits transmitted over the spatial channels further comprise:
instructions for utilizing approximated $l_2$ norm values.

24. The computer-program product of claim 22, wherein the instructions further comprise:
instructions for computing approximate $l_2$ norm values using an approximation technique selected from a group of approximation techniques, the group of approximation techniques including tri-maxmin approximation, sortsum approximation, and maxsum approximation.

25. The computer-program product of claim 24, wherein the instructions further comprise:
instructions for tuning at least one factor that affects an accuracy of the approximation technique.

26. The computer-program product of claim 22, wherein the instructions for searching the un-squared $l_2$ norm metrics for optimum metrics further comprise:
instructions for searching the non-squared $l_2$ norm metrics for minima.

27. The computer-program product of claim 22, wherein the instructions further comprise:
instructions for permuting a matrix of channel estimates for the spatial channels, to generate permuted matrices of channel estimates for the plurality of spatial streams; and
instructions for performing QR decomposition of the permuted matrices to generate a unitary matrix and an upper triangular matrix for the plurality of spatial streams.

28. The computer-program product of claim 27, wherein the instructions further comprise:
instructions for rotating a received signal with the unitary matrices to generate filtered outputs;
instructions for slicing filtered outputs to obtain sliced coded bits for the plurality of spatial streams;
instructions for hypothesizing symbols that may be transmitted on the spatial streams using sliced coded bits; and
instructions for decoding bits transmitted over the plurality of spatial sub-channels by using calculated log-likelihood ratios of coded bits.

* * * * *